US012546491B2

(12) United States Patent
Zhao et al.

(10) Patent No.: US 12,546,491 B2
(45) Date of Patent: Feb. 10, 2026

(54) BUFFERED BALANCED TYPE MOBILE PRIMARY-SECONDARY AIR CONDITIONER SYSTEM

(71) Applicant: NANTONG HENGZHAO ELECTRIC APPLIANCE CO., LTD, Jiangsu (CN)

(72) Inventors: Jun Zhao, Nantong (CN); Liwei Fu, Nantong (CN); Haitao Wang, Nantong (CN)

(73) Assignee: NANTONG HENGZHAO ELECTRIC APPLIANCE CO., LTD, Nantong (CN)

( * ) Notice: Subject to any disclaimer, the term of this patent is extended or adjusted under 35 U.S.C. 154(b) by 73 days.

(21) Appl. No.: 18/281,007

(22) PCT Filed: Mar. 7, 2022

(86) PCT No.: PCT/CN2022/079556
§ 371 (c)(1),
(2) Date: Sep. 8, 2023

(87) PCT Pub. No.: WO2022/188748
PCT Pub. Date: Sep. 15, 2022

(65) Prior Publication Data

US 2024/0295330 A1 Sep. 5, 2024

(30) Foreign Application Priority Data

Mar. 8, 2021 (CN) ........................ 202120493675.X

(51) Int. Cl.
*F24F 5/00* (2006.01)
*F24F 1/0003* (2019.01)
(Continued)

(52) U.S. Cl.
CPC .......... *F24F 5/0017* (2013.01); *F24F 1/0003* (2013.01); *F24F 1/0043* (2019.02); (Continued)

(58) Field of Classification Search
CPC ................... F24F 5/0017; F24F 5/0021; F24F 2005/0025; F25B 25/005; F25D 16/00
See application file for complete search history.

(56) References Cited

U.S. PATENT DOCUMENTS 4,302,944 A * 12/1981 Gainer .................... F25D 16/00 62/99
4,800,729 A * 1/1989 Hara ..................... F25B 25/005 62/503

(Continued)

FOREIGN PATENT DOCUMENTS

JP 1-244225 * 9/1989 ................ F24F 5/00

OTHER PUBLICATIONS

Machine translation of jp1-244225 (Year: 2025).*

*Primary Examiner* — Christopher R Zerphey
(74) *Attorney, Agent, or Firm* — Oliff PLC

(57) ABSTRACT

A buffered balanced type mobile primary-secondary air conditioner system wherein three working media are used in primary-secondary air conditioner system. The first working medium is a compressor refrigeration working medium, the second working medium is an energy storage and heat transfer working medium shared by the primary machine and the secondary machine, and the third working medium is a secondary machine energy storage and heat transfer working medium. This scheme establishes a buffer balance zone between the primary machine and the secondary machine to store the second working medium.

8 Claims, 2 Drawing Sheets

(51) Int. Cl.
*F24F 1/0043* (2019.01)
*F24F 1/0059* (2019.01)
*F25B 13/00* (2006.01)
*F25B 25/00* (2006.01)

(52) U.S. Cl.
CPC ............ *F24F 1/0059* (2013.01); *F25B 13/00* (2013.01); *F25B 25/005* (2013.01); *F24F 2005/0025* (2013.01); *F24F 2221/12* (2013.01); *F25B 2313/003* (2013.01); *Y02E 60/14* (2013.01)

(56) References Cited

U.S. PATENT DOCUMENTS

| | | | | | |
|---|---|---|---|---|---|
| 5,481,882 | A * | 1/1996 | Watanabe | F28D 20/025 | 62/70 |
| 5,724,827 | A * | 3/1998 | Yamaguchi | F24F 5/0017 | 62/434 |
| 5,894,739 | A * | 4/1999 | Temos | F24F 5/0017 | 62/436 |
| 6,389,827 | B2 * | 5/2002 | Agekura | F25D 16/00 | 62/185 |
| 7,631,515 | B2 * | 12/2009 | Jacobi | F28D 20/021 | 62/434 |
| 9,513,036 | B2 * | 12/2016 | Motomura | F24F 3/065 | |
| 11,333,373 | B2 * | 5/2022 | Kim | F28D 20/0034 | |

* cited by examiner

BUFFERED BALANCED TYPE MOBILE PRIMARY-SECONDARY AIR CONDITIONER SYSTEM

FIELD

This utility model belongs to the field of air conditioner technology, in particular to a buffered balanced type mobile primary-secondary air conditioner system.

BACKGROUND ART

As a member of air conditioner family, mobile air conditioners have achieved the effect of being movable and easy to install and use with an integrated structure, thus gaining widespread use among overseas users. However, the integrated structure hinders the expansion of market due to its high noise level and the need for installation.

In response to shortcomings of the aforementioned mobile air conditioner, energy storage mobile air conditioner has emerged in the market. Although it is still an integrated structure, energy storage technology is adopted, and exhaust duct is removed to avoid installation and random movement. Moreover, noise is significantly reduced during refrigeration or heating, which is popular among users. However, this type of energy storage mobile air conditioner emits cold or heat to the outside during energy storage, and due to the limitations of energy storage, the working time is limited, which is very inconvenient for users to use.

In view of this, the design of a mobile air conditioner that that can be moved freely without installation, energy-saving, with low noise, and can be used for outdoor heat exchange is the research topic of this utility model.

SUMMARY OF THE INVENTION

This utility model provides a buffered balanced type mobile primary-secondary air conditioner system that can be moved freely without installation, energy-saving, with low noise, and can be used freely for outdoor heat exchange.

To achieve the above objectives, the technical solution adopted by this utility model is:

A buffered balanced type mobile primary-secondary air conditioner system, consisting of a fixed or mobile primary machine and at least one mobile secondary machine; the primary machine is mainly composed of a compressor, a condenser, a throttling device, and an evaporator that are sequentially cyclically connected through a pipeline, and a first working medium is added to the pipeline of primary machine in working state. Its innovation lies in: Based on refrigeration cycle, an energy storage buffer box is provided for the evaporator in the primary machine; The energy storage buffer box is a closed container, and the evaporator is immersed in the energy storage buffer box, with a second working medium added to the energy storage buffer box in working state;

The secondary machine consists essentially of a liquid storage tank, an energy storage heat exchanger, a secondary machine fan, a secondary machine heat exchanger, and a delivery pump (26); The liquid storage tank is a closed container, and the energy storage heat exchanger is immersed in the liquid storage tank, with a third working medium added to the liquid storage tank in working state; The secondary machine heat exchanger is connected to the third working medium in the liquid storage tank through the delivery pump and a connecting pipe, and the secondary machine fan acts on the secondary machine heat exchanger.

A detachable connector is arranged between the primary machine and secondary machine; The detachable connector consists of a primary machine interface and a secondary machine interface, and the primary machine interface consists of a primary machine output joint and a primary machine input joint; The second working medium in the energy storage buffer box is connected to the primary machine output joint through a water pump and a conduit, and the primary machine input joint is communicated with the energy storage buffer box through a conduit; The secondary machine interface consists of a secondary machine output joint and a secondary machine input joint; The secondary machine input joint is connected to one end of the energy storage heat exchanger in the secondary machine through a conduit, and the other end of the energy storage heat exchanger is connected to the secondary machine output joint through a conduit; When the secondary machine is connected to the primary machine through the detachable connector, the primary machine output joint is docked and connected to the secondary machine input joint, while the secondary machine output joint is docked and connected to the primary machine input joint.

The relevant content in the above technical solution is explained as follows:

1. In the above solution, the primary machine is equipped with a set of primary machine interfaces, each of which is connected to the second working medium in the energy storage buffer box, and each primary machine interface forms a parallel connection with each other.

2. In the above solution, the primary machine is equipped with a primary machine heat exchanger and a primary machine fan; The second working medium in the energy storage buffer box is connected to one end of the primary machine heat exchanger through a water pump and a conduit, and the other end of the primary machine heat exchanger is connected to the second working medium in the energy storage buffer box through a conduit; The primary machine fan acts on the primary machine heat exchanger.

3. In the above solution, the primary machine is equipped with a four-way reversing valve, and the compressor in the primary machine is connected to the condenser and evaporator through the four-way reversing valve, forming a dual purpose refrigeration system for heating and cooling.

4. In the above solution, the energy storage buffer box is equipped with an icing zone and a non-icing zone, and the icing zone is connected to the non-icing zone; the evaporator is placed in the icing zone, and the primary machine output joint and primary machine input joint are connected to the non-icing zone. A partition board is arranged between the icing zone and the non-icing zone.

5. In the above solution, the liquid storage tank is provided with an icing zone and a non-icing zone, and the icing zone is connected to the non-icing zone; the energy storage heat exchanger is arranged in the icing zone, and the secondary machine heat exchanger is connected to the non-icing zone. A partition board is arranged between the icing zone and the non-icing zone.

6. In the above solution, the first working medium is a compressor refrigeration working medium, and the second working medium is an energy storage and heat transfer working medium shared by the primary machine and the secondary machine, and the third working medium is an energy storage and heat transfer working medium of the secondary machine; the freezing point temperature of second working medium is lower than the freezing point temperature of third working medium.

The design principle and concept of this utility model are:

The most prominent feature of the present invention is the establishment of a buffer balance zone between the primary machine and the secondary machine, that is, an energy storage buffer box is set up, and a second working medium with energy storage capacity is added to the buffer balance zone. Then soak the evaporator in the primary machine in the second working medium, and connect the second working medium with the energy storage heat exchanger in the secondary machine through a detachable connector, thereby transferring cooling capacity to the third working medium in the secondary machine. During refrigeration operation (taking refrigeration as an example, during heating operation, the evaporator becomes a condenser), cooling capacity generated by the primary machine is directly transferred to the buffer balance zone through the evaporator for transition, and then the cooling capacity of the buffer balance zone is transmitted to the third working medium of the secondary machine through the detachable connector and the energy storage heat exchanger in the secondary machine. Due to the buffer balance zone of the present invention serving as a bridge for buffer balance in a one-primary-to-multiple-secondary air conditioner system (one primary machine to multiple secondary machine), it effectively solves the problem how to get a mobile air conditioner without installation requirement, moved freely, energy-efficient, and with low noise.

Due to the application of the above technical solution, the utility model has the following advantages and effects compared to the existing technology:

1. This utility model uses three mutually isolated working media in the primary-secondary air conditioner system. The first working medium is a compressor refrigeration working medium, the second working medium is an energy storage and heat transfer working medium shared by the primary machine and the secondary machine (usually −12 to −25 degrees Celsius, such as automotive antifreeze), and the third working medium is an energy storage and heat transfer working medium of the secondary machine (the third working medium and the second working medium may use the same medium or different media), such as water. It is precisely due to the use of three working media in primary-secondary air conditioner system that it plays a good buffering and balancing role between the one-to-multiple primary and secondary machines.

2. This utility model adopts a second working medium to establish a buffer balance zone between the primary and secondary machines, thereby effectively alleviating the problem of the original one-to-multiple primary-secondary air conditioner system not adapting to a large load variation range due to constant refrigerant usage. Its technical conception is clever, its technical means are prominent, and its technical effects are significant, therefore it has prominent substantive characteristics and significant progress.

3. The utility model immerses the evaporator in the second working medium, which fully utilizes the high heat exchange efficiency of the liquid medium to achieve maximum heat exchange effect. Due to the low freezing point of the second working medium (usually −12 to −25 degrees), it can store a large amount of cooling capacity and provide cooling or heat for energy regulation and storage for the third working medium, achieving maximum energy storage and energy-saving effects. The second working medium can provide energy storage and exchange to the third working medium, as well as heat exchange to the primary machine heat exchanger, achieving maximum product performance.

4. The freezing point temperature of the second working medium of this utility model is lower than that of the third working medium, so that when the second working medium transfers cooling capacity to the third working medium, it can ensure that the third working medium of secondary machine achieves the maximum cold storage effect through icing.

5. The primary machine of the utility model is an energy storage air conditioner system. The primary machine may be designed as a fixed air conditioner or a mobile air conditioner. The secondary machine is an energy storage system with a water tank and heat exchanger, suitable for use as a mobile energy storage air conditioner. It can be flexibly designed according to actual needs and has strong practicality.

6. This utility model achieves energy storage when the primary machine system is working. Taking cold storage as an example, when the primary machine is working, the temperature of the second working medium in the energy storage buffer box drops below zero degrees Celsius. When the secondary machine needs energy storage, it can be connected to the primary machine through a detachable connector, and then exchanged cooling capacity with the third working medium in the secondary machine through a water pump and energy storage heat exchanger until the third working medium freezes. This utility model can be applied not only to single cooling refrigeration systems, but also to dual purpose refrigeration systems for both heating and cooling.

7. The secondary machine of this utility model is essentially a mobile air conditioner without a compressor, and a primary machine can be equipped with multiple secondary machines, thereby maximizing the working capacity and utilization rate of the primary machine. On the other hand, due to the absence of a compressor refrigeration system in the secondary machine, its structure is simple and its cost is low. For households that require multiple mobile air conditioners, purchasing one primary machine and multiple secondary machines will cost less, beneficial to market promotion and application.

8. The primary machine of this utility model can independently empower the secondary machine as a "charger", and can be used as an air conditioner by adding the primary machine fan and the primary machine heat exchanger at the time of empowerment or after separation from the secondary machine.

9. After completing energy storage, the secondary machine of this utility model can be separated from the primary machine for cooling or heating in any area. Due to the lack of compressor and exhaust noise, the noise of the secondary machine during operation is reduced by 25-30 decibels compared to traditional mobile air conditioners.

In above figures: 1. primary machine, 2. secondary machine; 3. compressor; 4. condenser; 5. throttling device; 6. evaporator, 7. four-way reversing valve; 8. drying filter; 9. energy storage buffer box; 10. water pump; 11. liquid storage tank; 12. condenser fan; 13. primary machine fan; 14. first working medium; 15. second working medium; 16. third working medium; 17. primary in machine heat exchanger; 18. energy storage heat exchanger, 19. secondary machine fan; 20. secondary machine heat exchanger; 21. pipeline; 22. detachable connector; 23. primary machine interface; 24. secondary machine interface; 25. connecting pipe; 26. delivery pump.

MODE OF CARRYING OUT THE INVENTION OR UTILITY MODEL

Figure 1:
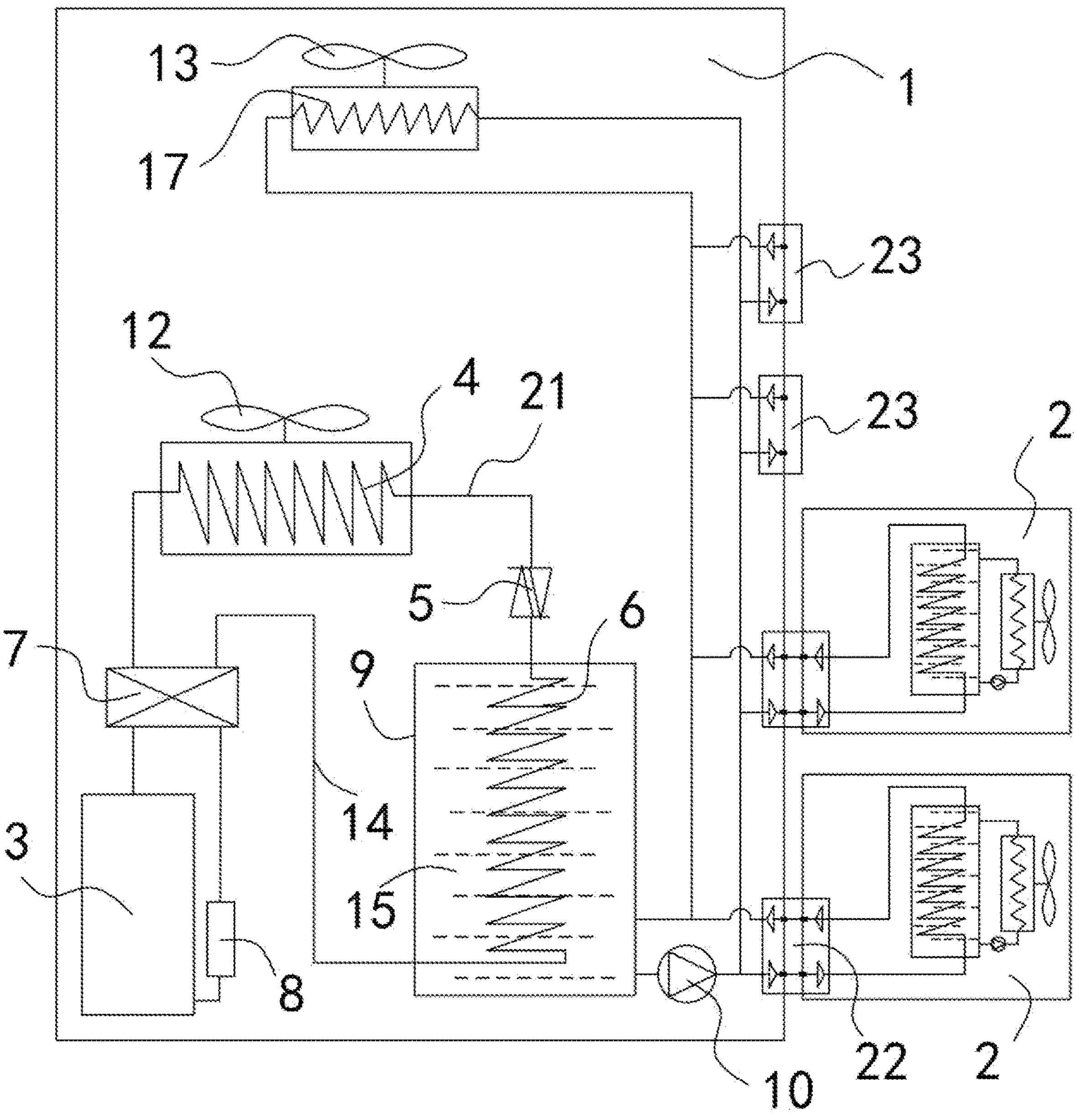
FIG. 1 is a structural schematic diagram of embodiment of this utility model.
Figure 2:
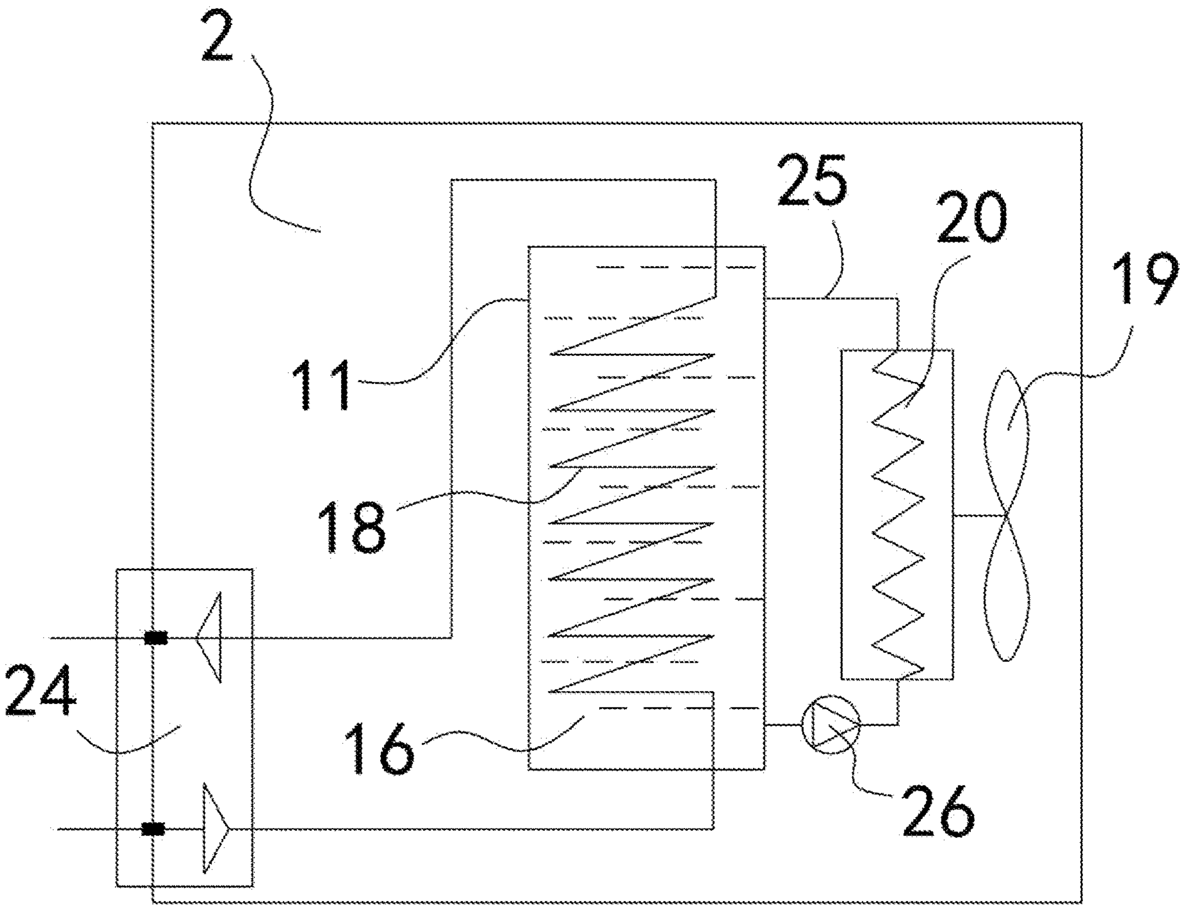
FIG. 2 is a structural schematic of secondary machine in FIG. 1 of embodiment of this utility model.

The following is a further description of the utility model in conjunction with the accompanying drawings and embodiments:

Embodiment: A Buffered Balanced Type Mobile Primary-Secondary Air Conditioner System As shown in FIGS. 1-2, the buffered balanced type mobile primary-secondary air conditioner system, consisting of a fixed or mobile primary machine 1 and at least one mobile secondary machine 2 (see FIG. 1); The primary machine 1 is a dual purpose refrigeration system for heating and cooling, composed of compressor 3, four-way reversing valve 7, drying filter 8, condenser 4, condenser fan 12, throttling device 5, and evaporator 6 connected through pipeline 21 according to the relationship shown in the left part of FIG. 1 (as the connection relationship between the components of the dual purpose refrigeration system is a prior art, and the left part of FIG. 1 is clearly illustrated, it will not be described in detail here). In working state, the first working medium 14 is added to the pipeline 21 of the primary machine 1 (see FIG. 1). In this embodiment, the first working medium 14 may use commonly used refrigerants in existing air conditioners.

In order to better illustrate the content of this embodiment; the refrigeration cycle is now used as the basis for explanation. In this embodiment, an energy storage buffer box 9 (see FIG. 1) is provided for evaporator 6 in the primary machine 1. The energy storage buffer box 9 is a closed container, and the evaporator 6 is immersed in the energy storage buffer box 9. In working state, a second working medium 15 is added to the energy storage buffer box 9 (see FIG. 1). In this embodiment, the second working medium 15 uses automotive antifreeze (such as ethylene glycol).

The secondary machine 2 is mainly composed of a liquid storage tank 11, an energy storage heat exchanger 18, a secondary machine fan 19, a secondary machine heat exchanger 20, and a delivery pump 26 (see FIG. 2). The liquid storage tank 11 is a closed container, and the energy storage heat exchanger 18 is immersed in the liquid storage tank 11, and a third working medium 16 is added to the liquid storage tank 11 in working state (see FIG. 2). In this embodiment, the third working medium 16 uses water or ethylene glycol. The secondary machine heat exchanger 20 is connected to the third working medium in the storage tank 11 through a delivery pump 26 and a connecting pipe 25, and the secondary machine fan 19 acts on the secondary machine heat exchanger 20 (see FIG. 2).

A detachable connector 22 is arranged between the primary machine 1 and the secondary machine 2 (see FIG. 1). The detachable connector 22 consists of a primary interface 23 (see FIG. 1) and a secondary interface 24 (see FIG. 2). The primary interface 23 is composed of a primary output joint and a primary input joint (not labeled, but clearly visible in FIG. 1). The second working medium 15 in the energy storage buffer box 9 is connected to the primary output joint through a water pump 10 and a conduit, and the primary input joint is connected to the energy storage buffer box 9 through a conduit (see FIG. 1) The secondary machine interface 24 is composed of a secondary machine output joint and a secondary machine input joint (see FIG. 2). The secondary machine input joint is connected to one end of the energy storage heat exchanger 18 in secondary machine 2 through a conduit, and the other end of the energy storage heat exchanger 18 is connected to the secondary machine output joint through a conduit (see FIG. 2). In the state where the secondary machine 2 is connected to the primary machine 1 through the detachable connector 22, the primary machine output joint is docked and connected to the secondary machine input joint, while the secondary machine output joint is docked and connected to the primary machine input joint. (see FIG. 1).

Regarding the detachable connector 22 between primary machine 1 and secondary machine 2, existing technology may be used for detachable pipeline connectors, or special detachable pipeline connectors can be specially designed. This is known to the person having ordinary skill in the art.

Three mutually isolated working media are used in the primary-secondary air conditioner system of the utility model. The first working medium 14 is a compressor refrigeration working medium, the second working medium 15 is an energy storage and heat transfer working medium shared by the primary machine 1 and the secondary machine 2 (usually −12 to −25 degrees Celsius, such as automotive antifreeze), and the third working medium 16 is an energy storage and heat transfer working medium of the secondary machine 2, such as water. The freezing point temperature of the second working medium 15 is generally lower than that of the third working medium 16. However, the second and third working media may also use the same medium, such as water.

In order to achieve the function that a primary machine 1 can match multiple secondary machines 2, a set of primary machine interfaces 23 can be equipped in the primary machine 1. Each primary machine interface 23 is connected to the second working medium 15 in the energy storage buffer box 9, and each primary machine interface 23 forms a parallel connection with each other. The primary machine 1 shown in FIG. 1 is equipped with four primary machine interfaces 23.

In this embodiment, the primary machine 1 is designed according to the structure of a fixed air conditioner, which includes compressor 3, condenser 4, condenser fan 12, throttling device 5, four-way reversing valve 7, and drying filter 8 installed outdoors to form an outdoor unit. Evaporator 6 and energy storage buffer box 9 can be installed outdoors or indoors. In order to directly have the function of a fixed air conditioner, primary machine 1 can be equipped with a primary machine heat exchanger 17 and a primary machine fan 13 (see FIG. 1). The second working medium 15 in the energy storage buffer box 9 is connected to one end of the primary machine heat exchanger 17 through a water pump 10 and a conduit, and the other end of the primary machine heat exchanger 17 is connected to the second working medium 15 in the energy storage buffer box 9 through a conduit. The primary machine fan 13 acts on the primary machine heat exchanger 17 (see FIG. 1). For this embodiment, if the primary machine 1 is not equipped with a primary machine heat exchanger 17 and a primary machine fan 13, then the primary machine 1 will be equivalent to a “charger” for the secondary machine 2, without the function of supplying cold or warm air.

In this embodiment, in order to maintain a state where the primary machine 1 can always charge cold or warm to the secondary machine 2, the second working medium 15 in the energy storage buffer box 9 cannot be completely frozen. Therefore, there may be an icing zone and a non-icing zone arranged inside the energy storage buffer box 9, with icing zone connected to non-icing zone. The evaporator 6 is placed in the icing zone, and the primary machine output joint and primary machine input joint are connected to the non-icing zone. In addition, a partition board may be arranged between the icing and non-icing zones to achieve better results.

In this embodiment, In order to keep the secondary machine always in a state where it is possible to provide cold or warm charging to the secondary machine heat exchanger 20, the third working medium 16 in the liquid storage tank 11 cannot be completely frozen. So there may be an icing zone and a non-icing zone arranged inside the liquid storage tank 11, with icing zone connected to non-icing zone. The energy storage heat exchanger 18 is placed in the icing zone, and the secondary machine heat exchanger 20 is connected to the non-icing zone. In addition, a partition board may be arranged between the icing and non-icing zones to achieve better results.

Taking the refrigeration working cycle as an example, the working process of this embodiment is described as follows.

1. Refrigeration of Primary Machine 1

As shown in FIG. 1, after the primary machine 1 is turned on, it switches to refrigeration mode. At this time, compressor 3 works to change the first working medium 14 from low-temperature and low-pressure gas to high-temperature and high-pressure gas, and delivers it to condenser 4. The condenser 4 releases heat to the outdoor air through the condenser fan 12, changing the first working medium 14 from a gaseous state to a liquid state and delivering it to throttling device 5. Throttling device 5 forces the first working medium 14 to decrease pressure and become a low-temperature and low-pressure liquid through throttling, and it is transported to evaporator 6, which absorbs cooling capacity to change the first working medium 14 from a liquid state to a gaseous state, while forming a low-temperature and low-pressure gas, which is then sent back to compressor 3. Due to the placement of evaporator 6 in the second working medium 15 of energy storage buffer box 9, evaporator 6 absorbs cooling capacity and causes the temperature of the second working medium 15 to decrease until the second working medium 15 in the icing zone solidifies and freezes.

2. Cooling and Operation of Secondary Machine 2

As shown in FIGS. 1 and 2, when secondary machine 2 needs to be cooled, dock and connect the secondary machine input joint on secondary machine 2 with the primary machine output joint, and at the same time, dock and connect the secondary machine output joint with the primary machine input joint. Start water pump 10, and the second working medium 15 in the energy storage buffer box 9 flows along the conduit through the energy storage heat exchanger 18 and returns to the energy storage buffer box 9. At this point, the second working medium 15 exchanges beat with the third working medium 16 through the energy storage heat exchanger 18, forcing the temperature of the third working medium 16 to decrease. When the freezing point temperature of the second working medium 15 is lower than that of the third working medium 16, the third working medium 16 first partially freezes and stores cooling capacity. After the cooling is completed, unplug the detachable connector 22, and at this time, the secondary machine 2 can be used as a mobile energy storage air conditioner. After the cooling storage of secondary machine 2 is consumed, the secondary machine 2 can be cooled again in the above way, and used in a cyclic manner. Since a set of primary machine interface 23 is simultaneously equipped on primary machine 1, each primary machine interface 23 is connected in parallel with the second working medium 15 in the energy storage buffer box 9. Therefore, one primary machine 1 can simultaneously connect multiple secondary machines 2 for cooling 3. Directly Cold Air Supplies from Primary Machine 1

As shown in FIG. 1, turn on the water pump 10, and the second working medium 15 exchanges heat with the primary machine heat exchanger 17 through the water pump 10 and conduit. At this time, turn on the primary machine fan 13 to send out cold air, which can be directly used as an indoor unit. From this, it can be seen that the primary machine can independently empower the secondary machine as a "charger", and can be used as an air conditioner by adding the primary machine fan 13 and the primary machine heat exchanger 17 at the time of empowerment or after separation from the secondary machine.

The following is an explanation of other implementations and structural changes of this utility model:

1. In the above embodiment, primary machine 1 is a dual purpose refrigeration system for heating and cooling. But this utility model is not limited to this, and the primary machine 1 can also be a single cooling refrigeration system. This is easy for the person having ordinary skill in the art to understand.

2. In the above embodiment, the number of energy storage buffer boxes 9 is one. However, this utility model is not limited to this. As for one primary machine 1, the energy storage buffer box 9 can be multiple. But each energy storage buffer box 9 is equipped with evaporator 6. The possible way to achieve this is to divide evaporator 6 into multiple small evaporators, and then connect them in a series-in-parallel way to form a whole. Each small evaporator can be placed in an energy storage buffer box 9. This is easy for the person having ordinary skill in the art to understand and accept.

3. In the above embodiment, the primary machine 1 shown in FIG. 1 is equipped with four primary machine interfaces 23. However, this utility model is not limited to this, and this quantity can be determined according to actual needs. For example, it can be equipped with two, three, five, or even more.

4. In the above embodiment, primary machine 1 is used as a fixed unit, which can be decomposed into two parts: outdoor unit and indoor unit, both of which have been fixed and installed relative to the building. However, this utility model is not limited to this, and the primary machine 1 can also be designed as an energy storage mobile air conditioner. Both primary machine 1 and secondary machine 2 can be moved. In this utility model, the mobile primary-secondary air conditioner system refers to an air conditioner system composed of a mobile or fixed primary machine and at least one secondary machine, and "mobile" refers to the mobility of the air conditioner system in use. This is also relative to fixed air conditioner.

The above embodiments are only intended to illustrate the technical concept and characteristics of the present utility model, and their purpose is to enable those familiar with this technology to understand the content of the present utility model and implement it accordingly, without limiting the scope of protection of the present utility model. Any equivalent changes or modifications made based on the spiritual essence of this utility model should be covered within the scope of protection of this utility model.

The invention claimed is:

1. A mobile primary-secondary air conditioner system, comprising:

a fixed or mobile primary machine; and at least one mobile secondary machine; wherein:

the primary machine comprises:

a compressor, a condenser, a throttling device, an evaporator, a pipeline that connects the compressor, the condenser, the throttling device, and the evaporator, and is configured to circulate a first working medium, an energy storage buffer box that is a closed container, the evaporator being immersed in the energy storage buffer box, the energy storage buffer box being configured to hold a second working medium in isolation from the first working medium, and a plurality of primary machine interfaces; and each secondary machine of the at least one mobile secondary machine comprises:

a liquid storage tank inside the secondary machine, an energy storage heat exchanger immersed in the liquid storage tank, a secondary machine fan inside the secondary machine, a secondary machine heat exchanger inside the secondary machine and outside the liquid storage tank, and a delivery pump inside the secondary machine; wherein:

the liquid storage tank is a closed container and is configured to hold a third working medium in isolation from the first working medium and the second working medium;

the secondary machine heat exchanger is connected to the third working medium in the liquid storage tank through the delivery pump and a connecting pipe, and the secondary machine fan acts on the secondary machine heat exchanger inside the secondary machine;

a detachable connector is arranged between the primary machine and a respective one of the at least one mobile secondary machine;

each detachable connector comprises (i) a primary machine interface among the plurality of primary machine interfaces and (ii) a secondary machine interface, and each primary machine interface comprises a primary machine output joint and a primary machine input joint;

the second working medium in the energy storage buffer box is connected to the primary machine output joint through a water pump and a conduit, and the primary machine input joint is connected with the energy storage buffer box through a conduit;

the secondary machine interface comprises a secondary machine output joint and a secondary machine input joint;

the secondary machine input joint is connected to one end of the energy storage heat exchanger in the secondary machine through a conduit, and the other end of the energy storage heat exchanger is connected to the secondary machine output joint through a conduit;

when the secondary machine is connected to the primary machine through the detachable connector, the primary machine output joint is docked and connected to the secondary machine input joint, while the secondary machine output joint is docked and connected to the primary machine input joint, and the second working medium flows between the energy storage buffer box in the primary machine and the energy storage heat exchanger that is immersed in the liquid storage tank in the secondary machine; and the secondary machine is structured such that, when the secondary machine is disconnected from the primary machine through the detachable connector, the secondary machine is a mobile air conditioner that performs air conditioning without being connected to the primary machine.

2. The mobile primary-secondary air conditioner system according to claim 1, wherein:

the first working medium is a compressor refrigeration working medium, the second working medium is an energy storage and heat transfer working medium shared by the primary machine and the secondary machine, the third working medium is an energy storage and heat transfer working medium of the secondary machine, and the freezing point temperature of the second working medium is lower than the freezing point temperature of the third working medium.

3. The mobile primary-secondary air conditioner system according to claim 1, wherein each primary machine interface forms a parallel connection with the other primary machine interfaces.

4. The mobile primary-secondary air conditioner system according to claim 1, wherein:

the primary machine is equipped with a primary machine heat exchanger and a primary machine fan;

the second working medium in the energy storage buffer box is connected to one end of the primary machine heat exchanger through the water pump and the conduit, and the other end of the primary machine heat exchanger is connected to the second working medium in the energy storage buffer box through another conduit; and the primary machine fan acts on the primary machine heat exchanger.

5. The mobile primary-secondary air conditioner system according to claim 1, wherein: the primary machine is equipped with a four-way reversing valve, and the compressor in the primary machine is connected to the condenser and evaporator through the four-way reversing valve, forming a dual purpose refrigeration system for heating and cooling.

6. The mobile primary-secondary air conditioner system according to claim 1, wherein:

the energy storage buffer box is equipped with an icing zone and a non-icing zone, and the icing zone is connected to the non-icing zone, the evaporator is placed in the icing zone, and the primary machine output joint and primary machine input joint are connected to the non-icing zone.

7. The mobile primary-secondary air conditioner system according to claim 1, wherein:

the liquid storage tank is provided with an icing zone and a non-icing zone, and the icing zone is connected to the non-icing zone, the energy storage heat exchanger is arranged in the icing zone, and the secondary machine heat exchanger is connected to the non-icing zone.

8. The mobile primary-secondary air conditioner system according to claim 1, wherein the primary-secondary air conditioner system is operable in a state in which one or more of the primary machine interfaces has no secondary machine connected thereto.

* * * * *